(12) United States Patent
Iotti

(10) Patent No.: US 10,843,909 B2
(45) Date of Patent: Nov. 24, 2020

(54) STABILIZERS FOR SELF-PROPELLED WORKING MACHINES

(71) Applicant: MANITOU ITALIA S.R.L., Castelfranco Emilia (IT)

(72) Inventor: Marco Iotti, Reggio Emilia (IT)

(73) Assignee: MANITOU ITALIA S.R.L., Castelfranco Emilia (IT)

( * ) Notice: Subject to any disclaimer, the term of this patent is extended or adjusted under 35 U.S.C. 154(b) by 0 days.

(21) Appl. No.: 15/896,157

(22) Filed: Feb. 14, 2018

(65) Prior Publication Data

US 2018/0237275 A1    Aug. 23, 2018

(30) Foreign Application Priority Data

Feb. 21, 2017    (IT) .................. 102017000019360

(51) Int. Cl.
| B66C 23/88 | (2006.01) |
| B66C 23/80 | (2006.01) |
| B66F 9/075 | (2006.01) |
| B66F 9/065 | (2006.01) |
| B60S 9/12 | (2006.01) |
| E02F 9/08 | (2006.01) |
| E02F 9/24 | (2006.01) |
| G01L 5/00 | (2006.01) |

(52) U.S. Cl.
CPC .............. *B66C 23/88* (2013.01); *B66C 23/80* (2013.01); *B66F 9/065* (2013.01); *B66F 9/07559* (2013.01); *B60S 9/12* (2013.01); *E02F 9/085* (2013.01); *E02F 9/24* (2013.01); *G01L 5/0061* (2013.01)

(58) Field of Classification Search
CPC . B66C 23/88; B66C 23/80; B60S 9/12; B66F 9/07559; B66F 9/065; G01L 5/0061; E02F 9/24; E02F 9/085
See application file for complete search history.

(56) References Cited

U.S. PATENT DOCUMENTS

| 4,258,566 | A | * | 3/1981 | Decker | ..................... G01L 5/04 |
| | | | | | 73/862.381 |
| 5,188,379 | A | * | 2/1993 | Krause | ..................... B60S 9/12 |
| | | | | | 254/423 |
| 6,351,696 | B1 | * | 2/2002 | Krasny | ............... E04G 21/0436 |
| | | | | | 701/50 |

(Continued)

FOREIGN PATENT DOCUMENTS

| JP | H0468095 U | 6/1992 |
| JP | H07285786 A | 10/1995 |
| WO | 2005042319 A1 | 5/2005 |

*Primary Examiner* — Jonathan M Dunlap
(74) *Attorney, Agent, or Firm* — Pearne & Gordon LLP

(57) ABSTRACT

The stabilizing system for a self-propelled working machine (1) such as a telescopic handler or the like, comprising a plurality of stabilizer arms (2) able to be placed on the ground so as to enable stabilization of the machine (1). The system (1) further comprises: one or more measuring devices (6) able to detect a pressure to which the arms (2) are subjected and to produce pressure signals according to the detected pressure; and at least one processing unit connected to the measuring devices (6) and comprising a position module configured to determine, based on the pressure signals, whether the arms (2) are placed on the ground.

19 Claims, 10 Drawing Sheets

(56) References Cited

U.S. PATENT DOCUMENTS

| | | | | |
|---|---|---|---|---|
| 6,655,219 | B2 * | 12/2003 | Saitoh | G01L 1/046 |
| | | | | 73/795 |
| 7,193,381 | B2 * | 3/2007 | Ford | H01R 13/641 |
| | | | | 254/418 |
| 7,199,534 | B2 * | 4/2007 | Ford | B66F 3/46 |
| | | | | 254/418 |
| 7,208,896 | B2 * | 4/2007 | Ford | B60S 9/04 |
| | | | | 254/418 |
| 7,364,044 | B2 * | 4/2008 | Hinata | B66C 23/80 |
| | | | | 212/277 |
| 7,784,354 | B2 | 8/2010 | Gelies | |
| 9,199,828 | B2 * | 12/2015 | Steinich | B66C 23/78 |
| 9,550,475 | B1 * | 1/2017 | Walker | B66C 23/78 |
| 10,343,653 | B1 * | 7/2019 | Garceau | B60S 9/12 |
| 2002/0020231 | A1 * | 2/2002 | Saitoh | G01L 1/046 |
| | | | | 73/862.473 |
| 2007/0012641 | A1 * | 1/2007 | Hinata | B66C 23/80 |
| | | | | 212/277 |
| 2007/0090612 | A1 | 4/2007 | Gelies | |
| 2012/0279938 | A1 * | 11/2012 | Benton | G01B 11/02 |
| | | | | 212/277 |
| 2014/0116975 | A1 * | 5/2014 | Benton | B66C 23/88 |
| | | | | 212/302 |
| 2016/0039648 | A1 * | 2/2016 | Magni | B66C 23/80 |
| | | | | 414/687 |
| 2016/0075311 | A1 * | 3/2016 | Garceau | B60S 9/12 |
| | | | | 701/36 |
| 2018/0022325 | A1 * | 1/2018 | Garceau | B60S 9/02 |
| | | | | 180/41 |

* cited by examiner

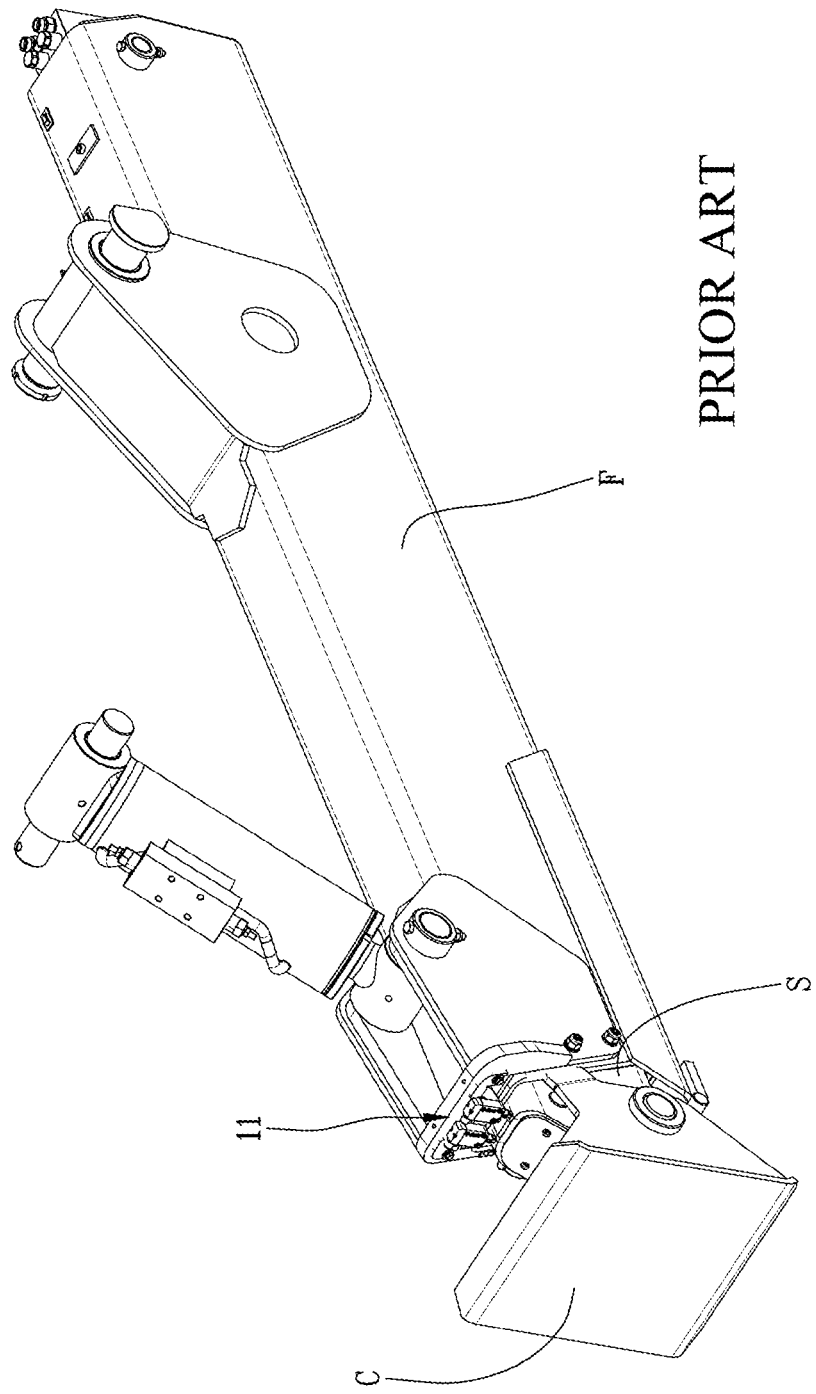

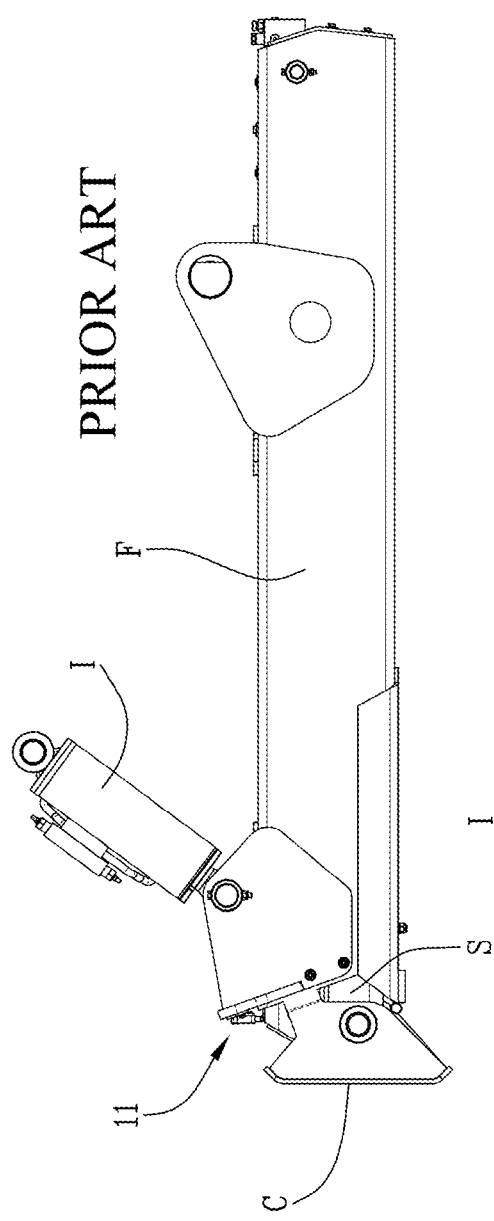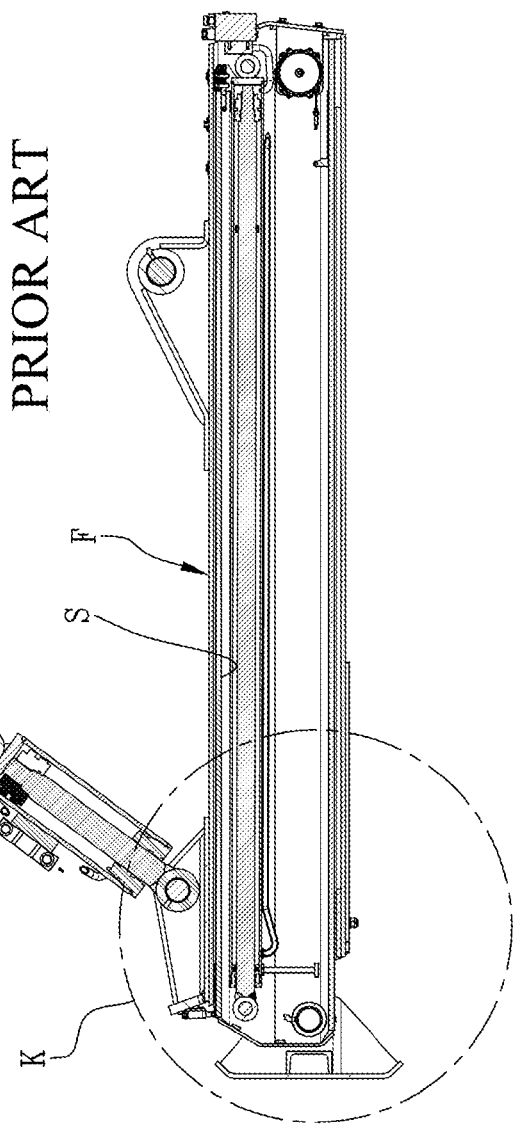

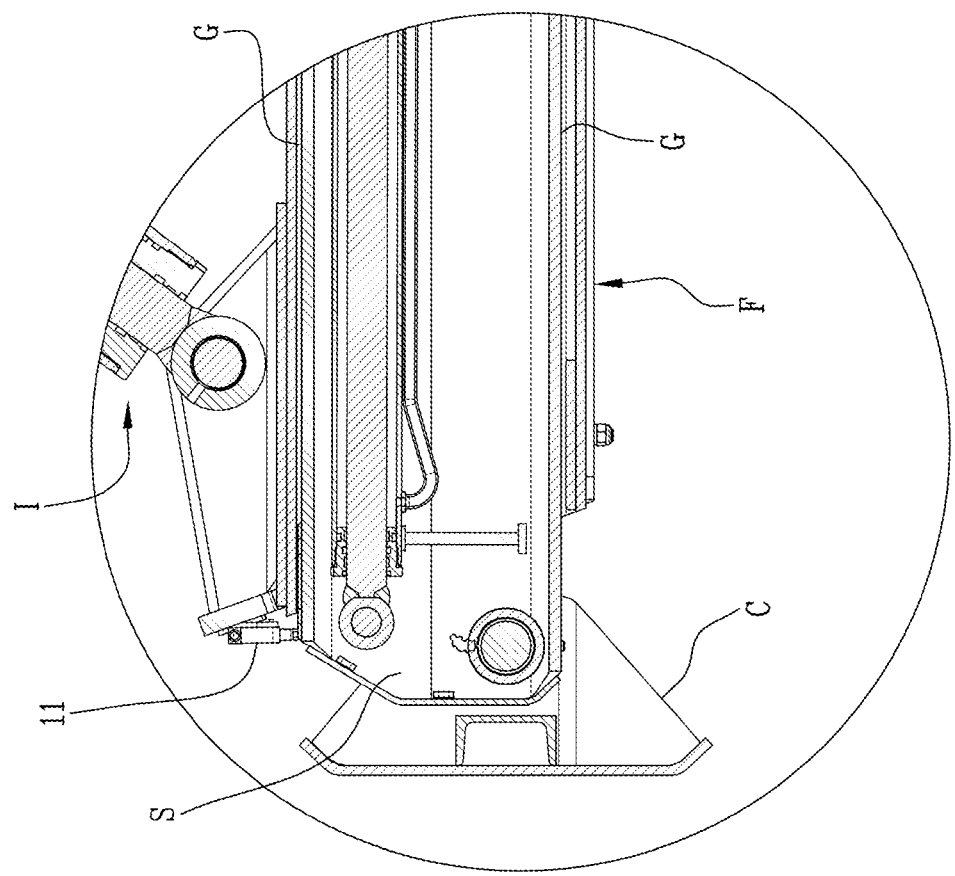

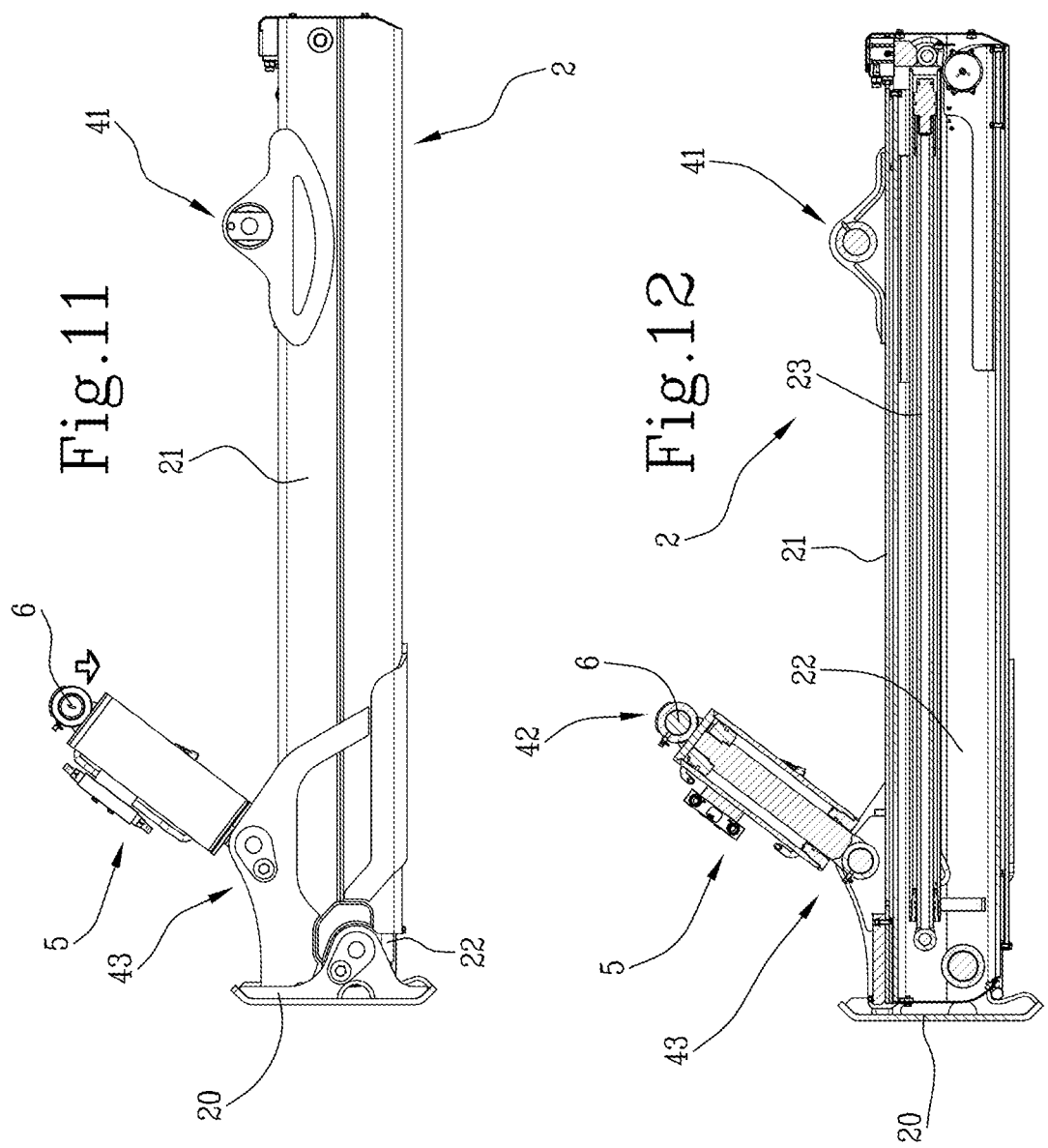

STABILIZERS FOR SELF-PROPELLED WORKING MACHINES

FIELD OF THE INVENTION

The present invention relates to improved stabilizers for self-propelled working machines, in particular telescopic handlers or telehandlers.

DESCRIPTION OF RELATED ART

Telescopic handlers are known, comprising a vehicle equipped with a movable frame on wheels, which comprises a platform assembled on the frame, which in turn mounts the driving cab and a telescopically extendable maneuvering arm.

At the distal end of the arm, a tool is present for lifting or displacing loads, such as, for example, a fork, a basket, a lateral translator, a hoist, etc.

To lift and displace loads to raised heights and with a significant range, it is necessary to stabilize the vehicle.

Stabilizers are known for telescopic handlers of the so called "scissor" type, comprising two stabilization units, provided anteriorly and posteriorly to the vehicle and mounted on the frame in proximity to the wheels.

Each stabilization unit comprises a pair of telescopically extendable arms, usually to a single extension, that have respective distal ends, intended to be placed on the ground by means of support feet (or "pads"), and proximal ends, hinged to a support frame.

The support frame is the component of the stabilization unit that is fixed directly to the vehicle. The two arms of each unit are arranged adjacent, one in front of the other, and are individually constrained to the related support frame by means of hydraulic cylinders, in turn hinged to the frame itself.

In practice, the stabilizer arms are arranged crossed over with each other and, during lifting, they move in a scissor-like way.

FIGS. 1-7 show an isolated view of one of the arms of known stabilizers.

Each stabilizer arm includes a hollow sleeve F in which an extension S slides which carries the pad C.

The sleeve F is hinged posteriorly to the support frame, while it is hinged anteriorly to a hydraulic cylinder I, in turn hinged to the frame.

When the vehicle needs to be stabilized, the cylinder I extends, making the related stabilizer arm turn and, at the same time, the extension S extends, so as to bring the pads C to the ground and to allow the lifting of the vehicle.

One of the fundamental pieces of information that allows the correct stabilization of the vehicle, is that related to the moment at which the pad C is placed on the ground, i.e. the condition in which the stabilizer arm is placed on the ground.

Currently, this information is obtained according to a geometric type method, which exploits the expedients explained below.

First of all, between the sleeve F and the extension S of a stabilizer arm, a certain amount of play is left, denoted by G in FIG. 4, which allows reciprocal lateral movement.

When the arm is raised (as in FIGS. 2 and 3), gravity keeps the extension S abutting the lower wall of the sleeve; in practice, the extension S is inclined towards the bottom in the sleeve F.

When the arm is placed on the ground, due to the play and the pressure of the ground, there is an inclination of the extension S upwards, with respect to its sleeve F.

This deviation is exploited for detecting the ground-placement state of the arm.

In fact, the known system uses micro switches M, located at the distal edge of the sleeve F, which in practice defines its opening within which the extension S slides, which detect when the lateral position of the extension S varies with respect to the sleeve F, thereby determined if the arm is placed on the ground or raised.

In particular, the switches M can be placed on the upper side of the sleeve F, and therefore above the extension S.

In this case, when the stabilizer arm is placed on the ground, the play makes the extension S tilt upwards and presses on the switches M, which transmit a signal to the central unit representing its placement on the ground.

Although this system is widely adopted by telehandler manufacturers, it does have some limits not resolved up to now and explained below.

Because of the play, when the extension is in the extended position and the pad C is placed on the ground, the external terminal edge, i.e. the distal edge, of the sleeve F presses with force on the extension S (where indicated by the arrow in FIGS. 5 and 6), creating a sort of knife effect that can deform the walls of the arm, having a negative effect on the structural capacity of known stabilizers, which can lead to the risk of overturning.

Another drawback of the known system is connected with the fact that, sometimes, working machines have to work on rural land or however not asphalted or paved surfaces.

In these circumstances, it may occur that, following precipitations or for other contingent reasons, solid ground becomes soft.

Therefore, it can happen that, when a vehicle is stabilized, and therefore raised by stabilizer arms, it is placed on ground that is initially sufficiently compact and that the placement of the arms on the ground is detected through play and micro switches, in the fashion described above.

Should the ground begin to give way at one of the pads, and the vehicle start to dangerously tilt and lose stability, this would not cause a loss of contact between the extension and the micro switches, therefore the operator would remain unaware of the danger condition.

In this context, the technical task underpinning the present invention is to propose a stabilizing system for self-propelled working machines and a method for determining the stabilization condition of a self-propelled working machine.

The stated technical task is reached by a system provided in accordance with claim 1 and by a method actuated in accordance with claim 14.

BRIEF DESCRIPTION OF THE DRAWINGS

Further characteristics and advantages of the present invention will become more apparent from the approximate and thus non-limiting description of a preferred, but not exclusive, embodiment of a system, as illustrated in the accompanying drawings, in which:

FIG. 1 is an axonometric view of a stabilizing arm according to the prior art;

FIG. 2 is a lateral view of the arm of the preceding figure, in a first operating condition;

FIG. 3 is a longitudinal section lateral view of the arm of the preceding figure, in the first operating condition;

FIG. 4 is an enlarged view of the detail K of FIG. 3;

FIG. 11 is a lateral view of the arm of the preceding figure, in a first operating condition;

FIG. 12 is a longitudinal section lateral view of the arm of the preceding figure, in the first operating condition;

DETAILED DESCRIPTION OF THE INVENTION

With reference to the appended figures, 1 denotes overall a vehicle comprising the system of the invention.

Figure 5:
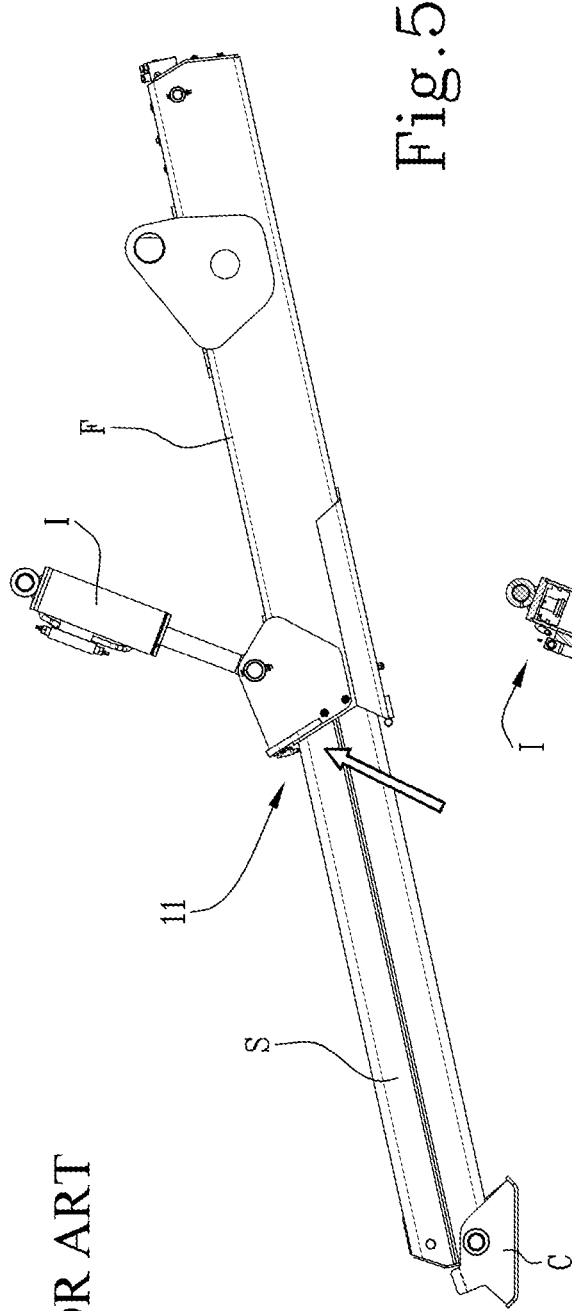
FIG. 5 is a lateral view of the arm of the prior art, in a second operating condition.
Figure 6:
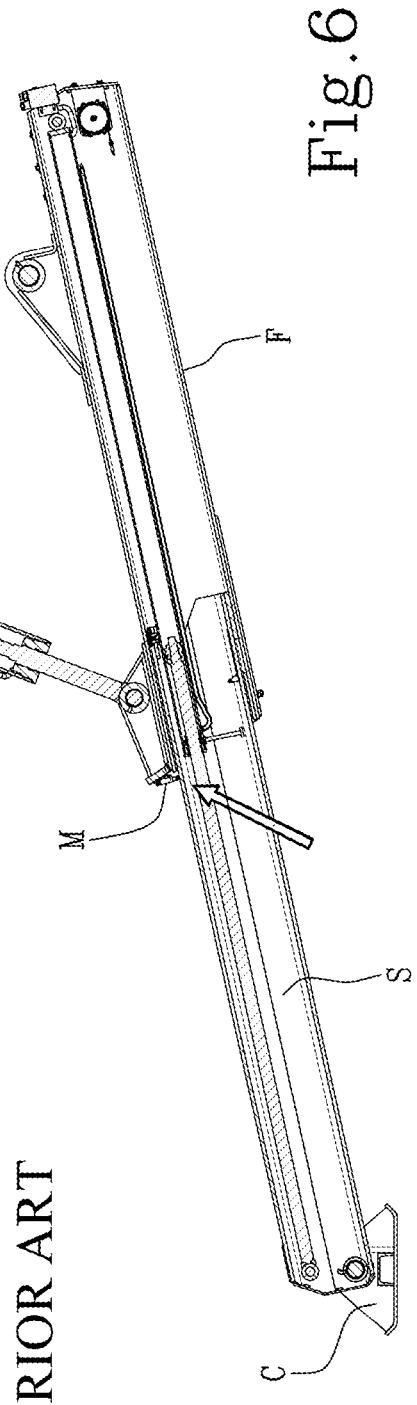
FIG. 6 is a longitudinal section lateral view of the arm of the preceding figure, in the second operating condition.
Figure 7:
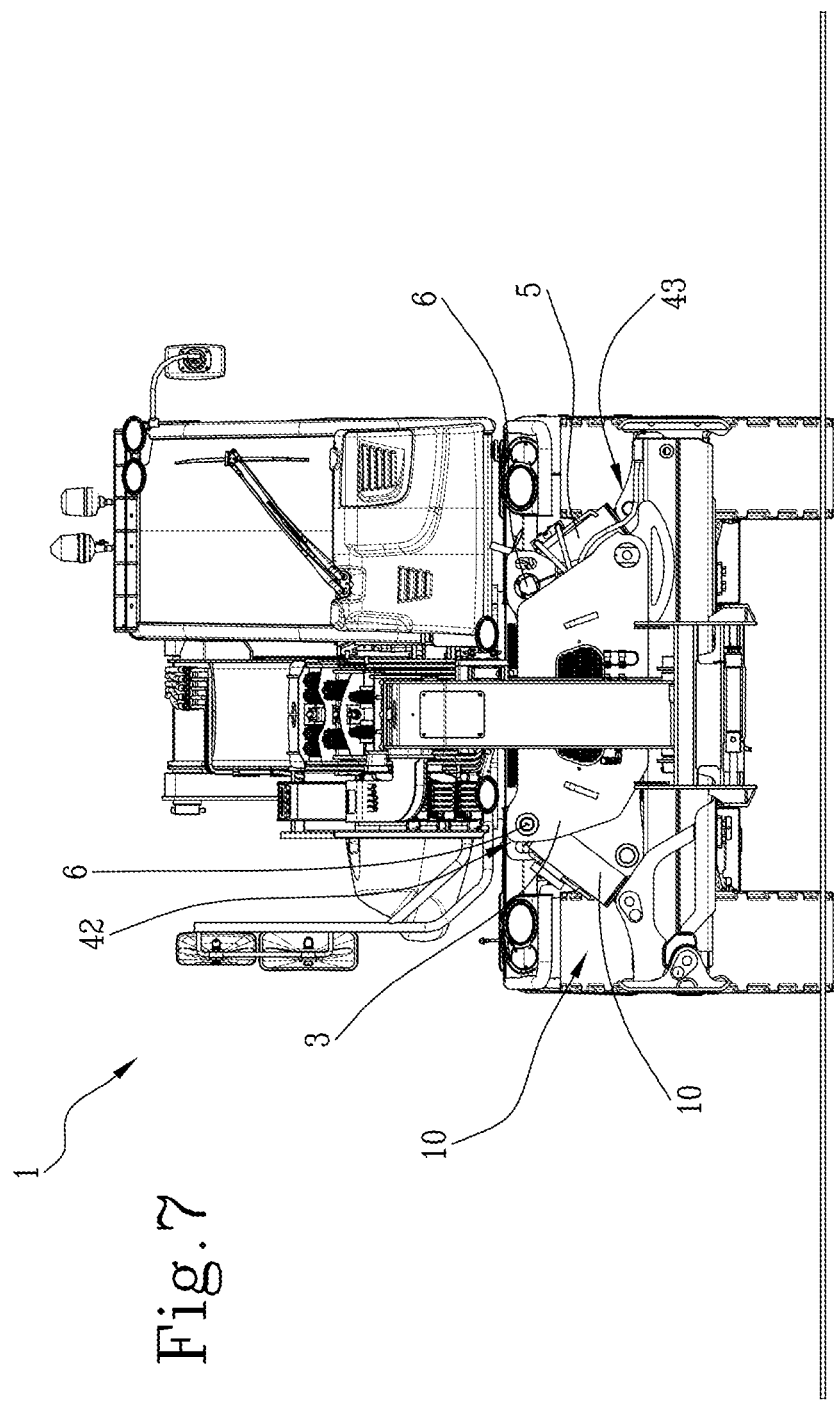
FIGS. 7-9 are front views, in different operating conditions, of a telehandler that mounts the stabilizers of the invention.
Figure 8:
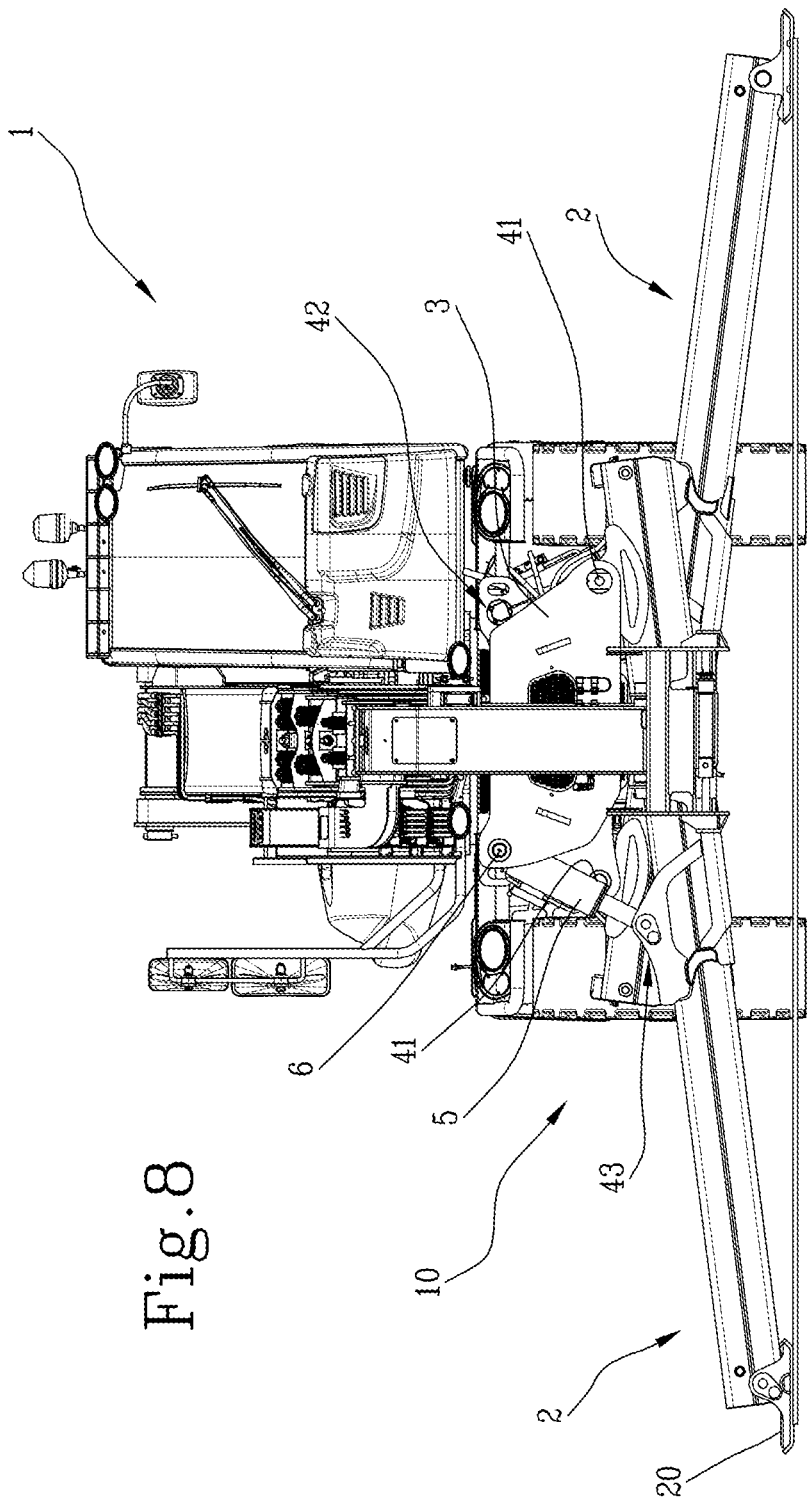
Figure 9:
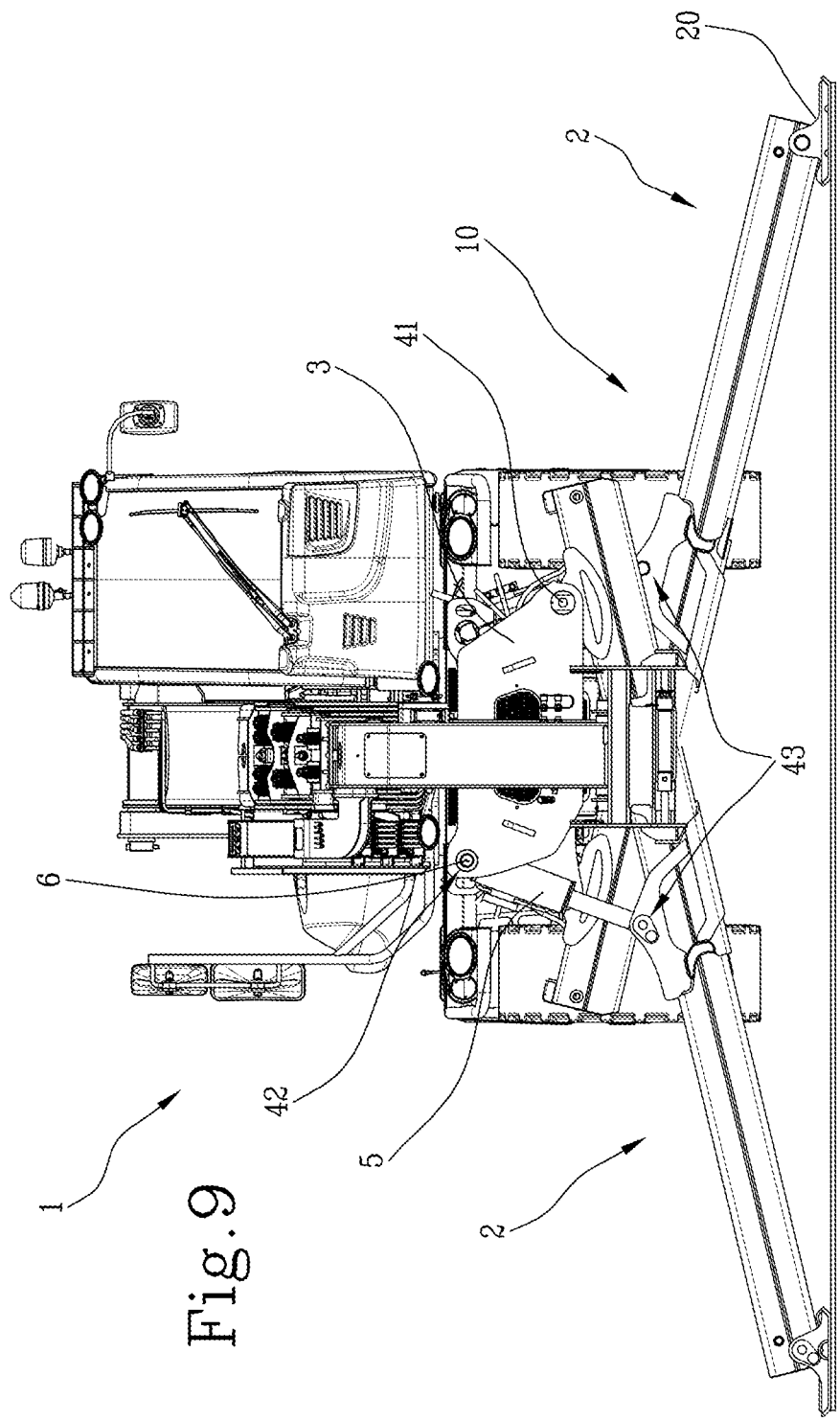

For the sake of precision, as shown in FIGS. 7-9, the system proposed has been especially devised for being implemented on a vehicle 1 comprising a self-propelled working machine such as a telehandler or an aerial platform, etc. and may be of the rotary type or possibly even fixed. The system according to the invention includes stabilizers 10 intended to be mounted on the vehicle 1 and provided with a plurality of stabilizer arms 10.

Preferably the stabilizers 10 provided in the system of the invention are of the so-called "scissor" type, i.e. they include two pairs of telescopic arms 2 located frontally and at the rear of the vehicle 1, in proximity to the wheels, with the arms 2 of each pair being hinged and activated so as to move in a scissor-like way.

In detail, each pair of arms 2 is mounted rotatably on a support element 3 which may be fixed or incorporated into the frame of the vehicle 1 and which, together with the related arms 2, forms a stabilizing unit.

The two arms 2 of the same stabilizing unit are mounted one in front of the other, substantially crossing over each other, although in the ground-placement position they may be parallel (see FIG. 7).

In general, the invention could also be used with stabilizers that are not of the scissor type.

In any case, the stabilizer arms 2 are movable between a raised ground-placement position, wherein they are distanced from the ground surface (FIG. 7), and in particular allow the free run of the vehicle 1, and at least one lowered position (FIG. 8), in which they are placed on the ground surface to initiate stabilization.

In practice, once the arms 2 have been placed on the ground surface, the lifting step begins, which leads to the stabilization of the vehicle 1 (FIG. 9).

In other words, the lowered position of the arms 2 is the contact one which initiates the lifting thrust.

Figure 10:
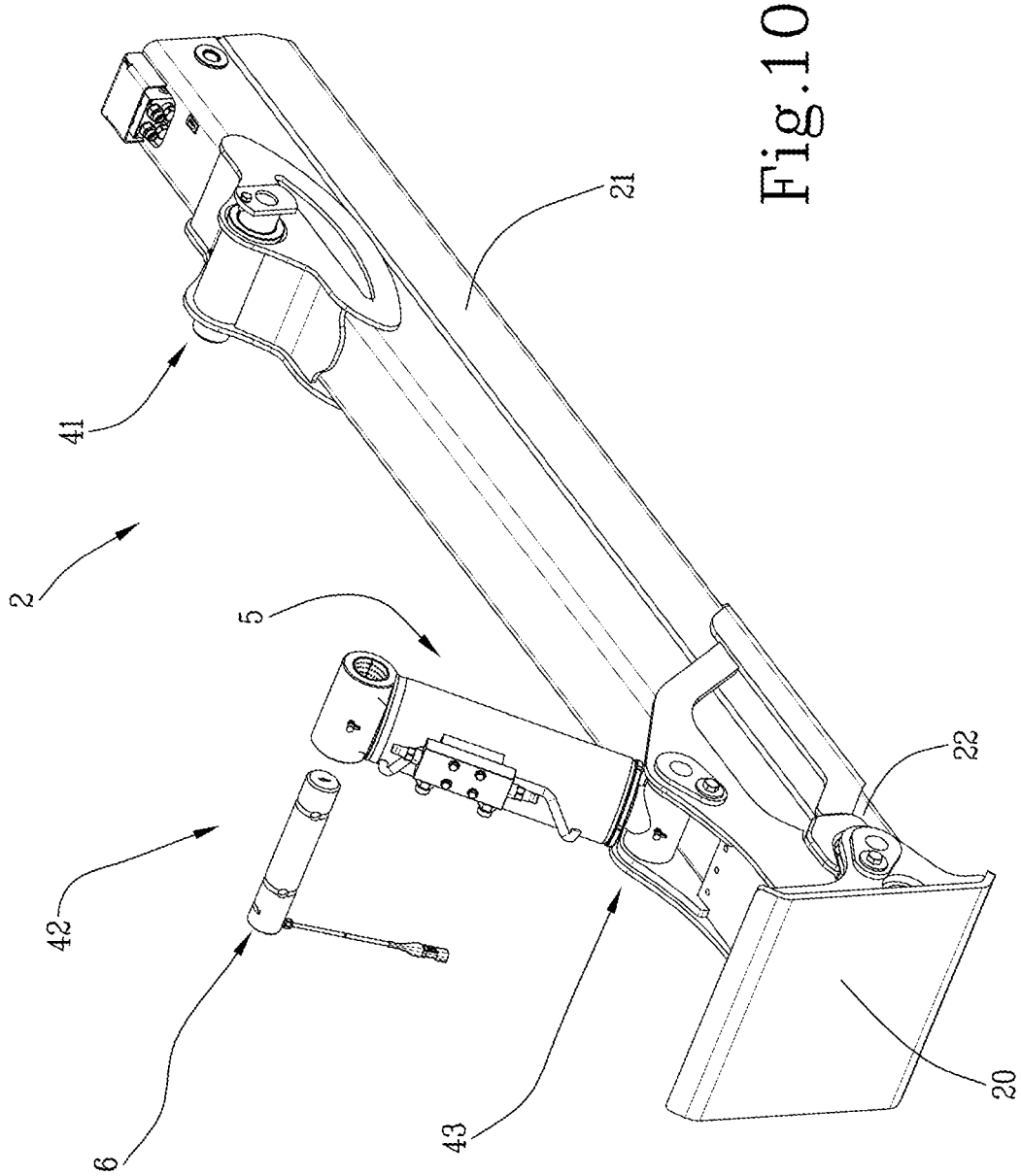
FIG. 10 is an axonometric, partially exploded, view of a stabilizing arm of the invention.

In fact, as is known, once the respective pad 20 has been placed on the ground surface, the arms 2 are not locked in position but clearly continue the movement until they have lifted the vehicle 1 and the desired stabilization condition has been reached, as exemplified in FIG. 10.

In general, a plurality of lowered positions and a plurality of consequent stabilization configurations are possible, according to the specific conditions in which the vehicle 1 needs to operate, with particular reference to the type of base on which the machine 1 needs to be stabilized.

In fact, based on the slope or the conformation of the ground surface on which the vehicle 1 is stabilized, the arms 2 may be placed on the ground with variable inclinations and lengths.

Furthermore, both in the case of scissor-like stabilizers 10 and in the case of different types of stabilizers, the arms 2 are preferably of the telescopic type, for example with a single extension. As shown in FIGS. 10-14, the arms 2 include a first segment 21, or sleeve, which is hollow and in which a second segment 22, or extension, is contained, which is equipped, at the distal end, with a support element, i.e. the already mentioned pad 20.

Figure 14:
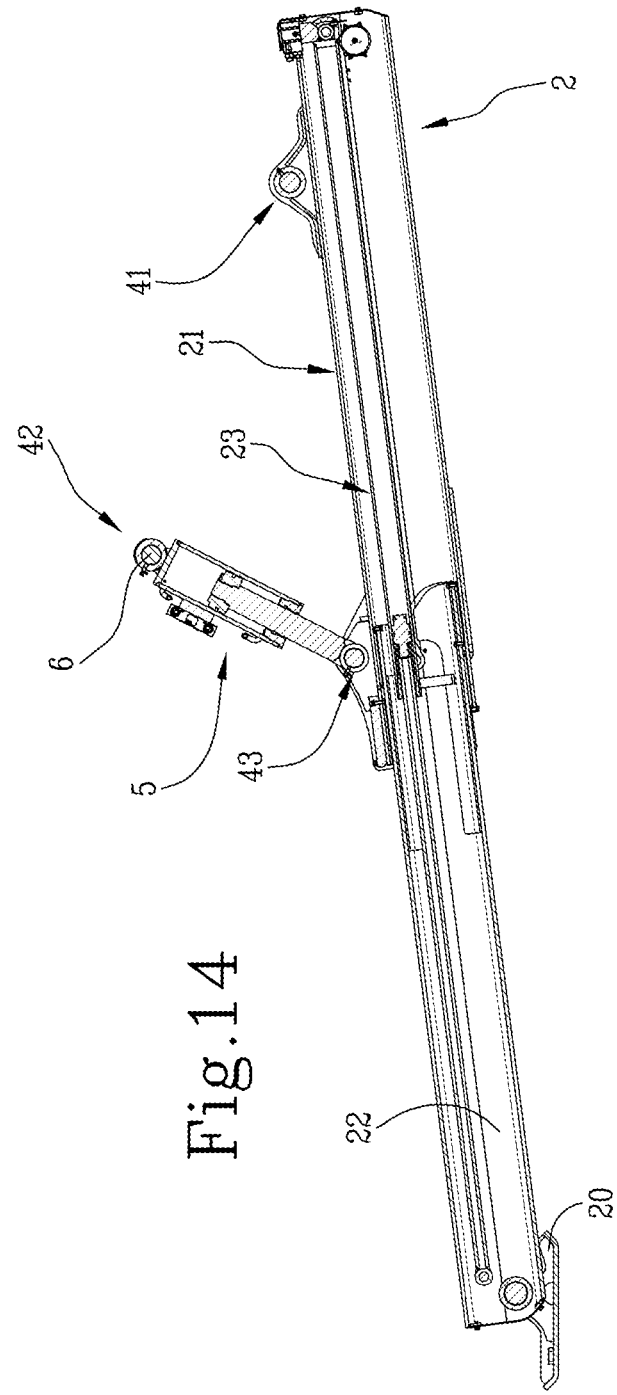
FIG. 14 is a longitudinal section lateral view of the arm of the preceding figure, in the second operating condition.

For the purpose of extending the extension 22 outside the sleeve 21, a linear actuator 23 is provided, preferably hydraulic, inserted between the extension 22 and the sleeve 21 and connected to each other at opposite ends (FIGS. 12 and 14).

Advantageously, the extension 22 is inserted in the sleeve 21 substantially without play, which prevents the risk of the knife effect which instead subsists for systems of the prior art.

This is permitted by the fact that the invention, as will be explained in detail below, does not require geometric means for detecting the placement of the arms 2 on the ground surface; it follows that the system proposed does not even need any significant play between the two segments 21, 22 of the arm 2.

In the case of using scissor-like stabilizers 10, the aforementioned support element 3 is connected to the sleeve 21 of each arm 2 of the pair, through a first hinge, denoted with 41 in FIGS. 8-14.

Furthermore, for the purpose of the movement of the arm 2 about the first hinge 41, the use of a related actuator is envisaged, comprising a hydraulic cylinder 5, whose thrust is also used for lifting in the stabilization step.

Each actuator 5 is connected through a second hinge 42 to the support element and, through a third hinge 43, to the sleeve 21 of the respective arm 2.

The first and the third hinge 41, 43 are arranged in two distinct points of the length of the sleeve 21, preferably at the upper side, the first being more internal, i.e. closer to the proximal end of the sleeve 21, and the third more external, i.e. closer to the distal end.

In practice, the hydraulic cylinders 5 are activated in thrust to bring the arms 2 to the ground surface and to lift the vehicle 1, while they are activated in retrieval when the vehicle 1 is brought back to be placed on the wheels and the arms 2 are raised into the ground-placement position.

The system according to the invention includes a processing unit, provided to determine whether the stabilizer arms 2 are placed firmly on the ground, according to modalities detailed below.

In general, it is to be noted that, in the present description, the processing unit is presented divided into distinct functional modules for the sole purpose of describing the functions thereof in a clear and complete manner.

In practice, the processing unit can consist of a single electronic device, even of the type commonly found on this type of machine, duly programmed to perform the functions described, and the various modules can correspond to hardware and/or routine software entities belonging to the programmed device.

Alternatively, or additionally, such functions may be performed by a plurality of electronic devices over which the aforesaid functional modules can be distributed.

In general, the processing unit can use of one or more microprocessors for performing the instructions contained in memory modules and the aforesaid functional modules may, also, be distributed over a plurality of local or remote calculators based on the architecture of the network in which they reside.

Like everything regarding the system according to the invention, the processing unit also complies with safety standards in force.

According to an important aspect of the invention, the system comprises one or more measuring devices 6 adapted to detect the pressure to which the arms 2 are subject and to produce pressure signals based on the pressure measured.

In the present description, when the "pressure" measured on the arms is mentioned, it does not necessarily mean the pressure detected in the hydraulic devices acting on the arms 2, such as the above-mentioned cylinders 5.

In fact, it is mentioned that the invention envisages embodiments in which the measuring devices 6 are force sensors; in practice, what is measured by such devices is the mechanical strain due to the active or reaction load, as explained more clearly below in the description of some non-limiting embodiments of the system proposed.

The aforementioned processing unit is connected with the measuring devices 6, for example through cabling or telecommunication means and comprises a position module configured to determine whether the arms 2 are placed on the ground surface, based on said pressure signals.

The measurement devices 6 according to the invention verify the presence of a reaction load on the arms 2 and, in this sense, they constitute a dynamic means for verifying the stabilization condition, therefore offering an alternative to geometric means of the known type.

Thanks to these expedients, the system is able to directly or indirectly measure the forces to which the arms 2 are subject, therefore determining, moment by moment, whether they are firmly placed on the ground surface or whether the arms 2 are not stabilizing.

Preferably, the system includes at least one measuring device 6 for each arm 2 and, in this case, the processing unit is able to determine the condition of placement on the ground for each arm 2, independently.

In other words, the position module checks whether the individual arm 2 is firmly placed on the ground, making it possible to determine which arms 2 are contributing to the stabilization of the vehicle 1 and which ones instead are not in a stabilizing condition and therefore make the vehicle 1 subject to the risk of overturning.

Therefore, in the event that four arms 2 are provided, split into two pairs, the system includes at least four measuring devices 6.

The measuring devices 6 may each comprise one force sensor, connected to a respective stabilizer arm 2, which sensor may for example comprise a strain pin 6, shown in an exploded view in FIG. 10.

In the preferential embodiment of the invention, illustrated in the appended FIGS. 8-15, the strain pin 6 that determines the reaction load of each arm 2 is included in the aforementioned second connecting hinge 42 between the hydraulic cylinder 5 and the support element 3.

Alternatively (or additionally), the strain pins may be included in the aforementioned second hinge 42 connecting the sleeve 21 of the related arms 2 and the cylinders 5 associated therewith.

Furthermore, alternatively (or additionally), the strain pins may be comprised in the first hinge 41 connecting the sleeve 21 of the related arms 2 and the support element 3.

An embodiment may also be possible wherein the measuring device is of the type adapted to detect the fluid-dynamic pressure and is inserted or fluid-dynamically connected to the aforementioned hydraulic cylinder 5 that moves the stabilizer arm 2.

Since the invention uses dynamic and not geometric means for determining the condition of the arms 2 placed on the ground surface, it will not only be possible to prevent play between the sleeve 21 and the extension 22, but also to check the solidity of the support.

In fact, given that the system proposed allows the measurement of the pressure to which the arms 2 are subject, directly caused by the reaction load, it is possible to determine whether one or more of the arms 2 are in contact with a soft base or if the solidity of the base is reduced over time.

For that purpose, it may also be useful to use the preferential expedient reported below.

The position module is configured to check if the pressure detected by the measuring devices 6 is greater than at least one predetermined ground-placement threshold.

In practice, it may be provided that, for the purpose of establishing whether an arm 2 is placed firmly on the ground, the reaction load measured must be greater than a minimum threshold.

It follows that if the pressure to which a given arm 2 is subject does not reach the threshold or, after reaching it, it drops below the threshold again, then it means that said arm 2 is not placed firmly on the ground and therefore cannot contribute to the stabilization of the vehicle 1.

In the event of using a force sensor, such as the strain pin 6, the information can also be obtained regarding the direction of the pressure to which the arm 2 is subject.

Figure 13:
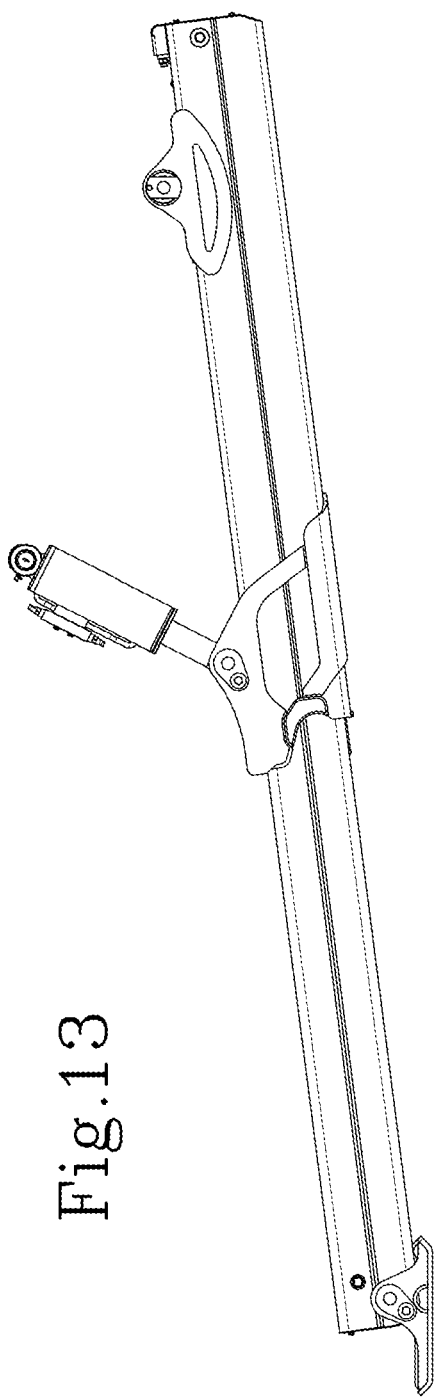
FIG. 13 is a lateral view of the arm of the invention, in a second operating condition.

Therefore, when the arms 2 are raised, the related sensor detects a force directed downwards due to the weight of the movable parts of the arm 2 and exemplified by the arrow of FIG. 11, whereas when the arm 2 is placed on the ground surface, with the cylinder in thrust, the sensor will determine a reaction force upwards, exemplified by the arrow of FIG. 13.

Advantageously, the processing unit may comprise a direction module configured to determine the position of the arms 2, in accordance with the direction of the force detected by the respective sensors.

The invention may envisage the use of a user interface, comprising or connected to visual and/or acoustic devices, placed inside the cab and provided to inform the operator as to whether the condition of the stabilizers 10 firmly placed on the ground surface has been reached and maintained.

Furthermore, the invention may also envisage the processing unit including a safety module configured to determine whether the pressure measured by one or more measuring devices 6 is greater than or less than a safety threshold based on the maximum load to which an arm 2 may be subject without the vehicle overturning.

In practice, it may happen that the load weighing on one of the arms 2 is particularly high, such that it can lead to the risk of the machine 1 overturning.

Thanks to the invention, it is possible to set a safety threshold equal to a pressure lower than that which would lead to overturning at one or more arms 2, so that the processing unit is able to determine an alarm condition before the overturning occurs.

The user interface can be configured to warn the operator that in at least one of the arms 2 the pressure detected is higher than the safety threshold.

Also in this case, the safety threshold may be determined by referring to standards in force.

The user interface can preferably comprise visual representation means showing the operator which arm 2 is strained beyond the safety threshold.

The presence of visual or auditory signallers is not excluded, placed outside the vehicle 1, to provide signals to operators dismounted from the cab and/or telecommunication means, configured to transmit alarm information to movable devices, concerning the condition of exceeding the safety threshold.

The invention is also configured as a method for determining the ground-placement state of stabilizers 10 for self-propelled working machines, such as those already discussed above. The method of the invention comprises the following steps:

providing a working machine that is equipped with stabilizers 10 comprising a plurality of arms that are movable between a raised position and at least one lowered position, in which the arms 2 are placed on the ground;

lowering the arms 2 towards the lowered position;
measuring the pressure exerted on the arms 2; and
establishing whether the arms 2 are firmly placed on the ground based on the pressure measurement made on them.

Preferably, whether the arms 2 are firmly placed on the ground is established by checking whether the pressure measured on the arms 2 is above or below a predetermined placement threshold.

Furthermore, the method may comprise a step of determining whether the pressure measured on the arms 2 is above or below a safety threshold, which is a function of the maximum load to which an arm 2 can be subjected without the machine 1 overturning.

In general, the method of the invention may comprise steps that actuate the functions exerted by the components of the system, previously described.

Furthermore, the invention is also configured as a computer program, which, when running on a processing unit, executes the steps of the method described above.

The invention claimed is:

1. A stabilizing system for a self-propelled working machine (1), comprising a scissor stabilizer (10) that includes a pair of stabilizer arms (2) able to be placed on a ground so as to enable stabilization of said machine (1), each stabilizer arm (2) being rotatable and including an activator (5) suitable for determining a rotation of its respective stabilizer arm (2) for lifting of the machine (1), characterized in that the system comprises:
 a measuring device (6) for each arm (2) able to detect a pressure to which said arm (2) is subjected and to produce a pressure signal according to said detected pressure; and
 at least one processing unit connected to said measuring devices (6) and comprising a position module configured to determine, based on said pressure signals, whether the arms (2) are placed on the ground, wherein said scissor stabilizer (10) is equipped with a support element (3) for said pair of arms (2), said support element (3) being fixed or fixable to the working machine (1), a sleeve (21) of each arm (2) being connected by means of a first hinge (41) to said support element (3), and wherein a hydraulic cylinder (5) is comprised in each actuator, the cylinder (5) being connected by means of a second hinge (42) to said support element (3) and by means of a third hinge (43) to the sleeve (21) of a respective arm (2), wherein each one of said measuring devices (6) comprises a force sensor (6) connected to a respective stabilizer arm (2), and wherein at least one of said measuring devices (6) is a first measuring device (6) which comprises an extensometer pin (6) included in said second hinge (42) or said third hinge (43).

2. The system according to claim 1, wherein each stabilizer arm (2) is telescopic and comprises an extractable element (22) slidably inserted substantially without any play in the sleeve (21) of the respective arm (2) so as to enable extension or retraction of the arm (2), the extractable element (22) bearing a member (20) for being placed on the ground.

3. The system according to claim 1, wherein said position module is configured to check whether the pressure detected by one or more of said measuring devices (6) is above or below at least one pre-established placement threshold, thereby determining whether the arms (2) are placed on the ground.

4. The system according to claim 1, comprising a second scissor stabilizer (10) that includes a pair of said arms (2) for stabilization.

5. The system according to claim 1, wherein at least one of said measuring devices (6) comprises an extensometer pin (6) included in said second hinge (42).

6. The system according to claim 1, wherein at least one of said measuring devices (6) comprises an extensometer pin (6) included in said first hinge (41).

7. The system according to claim 1, wherein at least one measuring device for measuring the fluid dynamic pressure is inserted in the hydraulic cylinder (5) associated with at least one arm (2) or it is fluid-dynamically connected thereto.

8. The system according to claim 1, wherein said force sensor (6) is suitable for detecting a direction of the detected pressure and said processing unit comprises a direction module configured to determine the position of the respective arm (2), in accordance with the direction detected by the sensor (6).

9. The system according to claim 1, wherein said processing unit comprises a safety module configured to determine whether the pressure measured by one or more of said measuring devices (6) is above or below a safety threshold which is a function of a maximum load to which an arm (2) can be subjected without the machine (1) overturning.

10. A self-propelled working machine (1) comprising a stabilizing system according to claim 1.

11. The self-propelled working machine (1) according to claim 10, wherein the self-propelled working machine (1) is a telescopic handler.

12. The system according to claim 1, wherein the self-propelled working machine (1) is a telescopic handler.

13. The system according to claim 1, wherein at least one of said measuring devices (6) comprises an extensometer pin (6) included in said third hinge (43).

14. The system according to claim 1, wherein said first measuring device (6) consists of said extensometer pin (6).

15. A method for verifying a ground-placement state of stabilizers (10) for a self-propelled working machine (1), comprising the following steps:
 providing a working machine (1) that is equipped with stabilizers (10) comprising a plurality of arms (2) that are moveable between a raised, resting position and at least one lowered position, in which the arms (2) are placed on the ground, wherein each arm (2) is provided with an extensometer pin (6) in a second hinge (42) connecting a hydraulic cylinder (5) to a support element (3) or in a third hinge (43) connecting a hydraulic cylinder (5) to a sleeve (21) of a respective arm (2);
 lowering the arms (2) towards the lowered position;

measuring the pressure exerted on the arms (2); and establishing whether the arms (2) are placed on the ground based on the pressure measurement made on them.

16. The method according to claim 15, wherein whether the arms (2) are placed on the ground is established by checking whether the pressure measured on the arms (2) is above or below a predetermined placement threshold.

17. The method according to claim 15, comprising the step of determining whether the pressure measured on the arms (2) is above or below a safety threshold, which is a function of the maximum load to which an arm (2) can be subjected without the machine (1) overturning.

18. A computer-readable medium comprising a physical substrate, the physical substrate having encoded thereon instructions for carrying out the steps of the method according to claim 15.

19. The method according to claim 15, wherein the self-propelled working machine (1) is a telescopic handler.

* * * * *